July 7, 1953     A. C. ROWLEY     2,644,479

DRY PIPE VALVE

Original Filed July 21, 1950

Inventor:
Arthur C. Rowley
by his Attorneys
Howson & Howson

Patented July 7, 1953

2,644,479

UNITED STATES PATENT OFFICE 2,644,479

DRY PIPE VALVE

Arthur C. Rowley, Drexel Hill, Pa., assignor to Globe Automatic Sprinkler Company of Pennsylvania, Philadelphia, Pa., a corporation of Pennsylvania Original application July 21, 1950, Serial No. 175,151, now Patent No. 2,586,720, dated February 19, 1952. Divided and this application June 29, 1951, Serial No. 234,276

8 Claims. (Cl. 137—312)

This application is a division of my prior application 175,151, filed July 21, 1950, for Dry Pipe Valve, which matured into Patent 2,586,720, February 19, 1952.

This invention relates to an improvement in valves of the type employed in dry pipe sprinkler systems, said valves functioning to separate the sprinkler system from the water supply main under normal conditions and comprising means operative automatically as a result of the opening of one or more of the sprinkler heads of said system to release the valve element for actuation by pressure of the water in the main to admit the water to the previously dry system.

It has been customary to provide valves of this class with rubber or other gaskets of more or less conventional form which may be readily replaced in the event of deterioration after extended periods of use. These gaskets, while functionally adequate, have been subject to relatively rapid deterioration and consequent leakage, and being of relatively simple form, have frequently been replaced by maintenance men with extemporized gaskets cut from available materials and usually entirely inadequate for efficient operation under the conditions to which the valve is subjected in service. This replacement of the original gasket by inferior gaskets has created an impression of inadequacy in the valve structure as a whole.

An object of the present invention is to provide a highly efficient form of gasket and associated valve structure departing sufficiently from the conventional to effectively preclude replacement by extemporized gaskets or by any gasket other than that provided by the manufacturer for the specific purpose.

Figure 1:
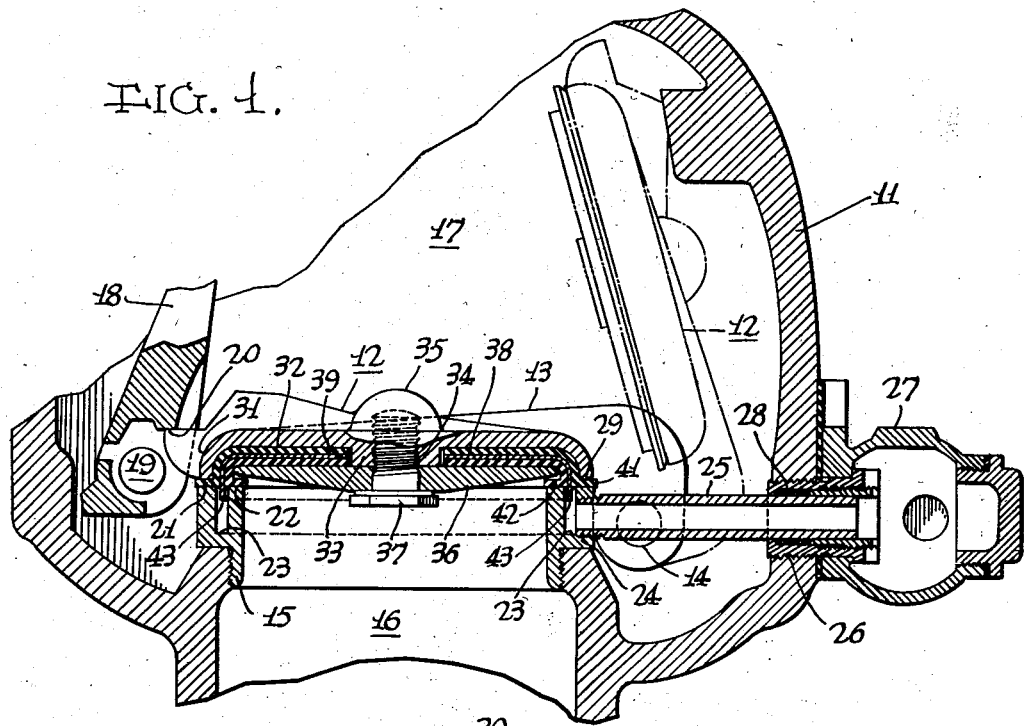
Figure 2:
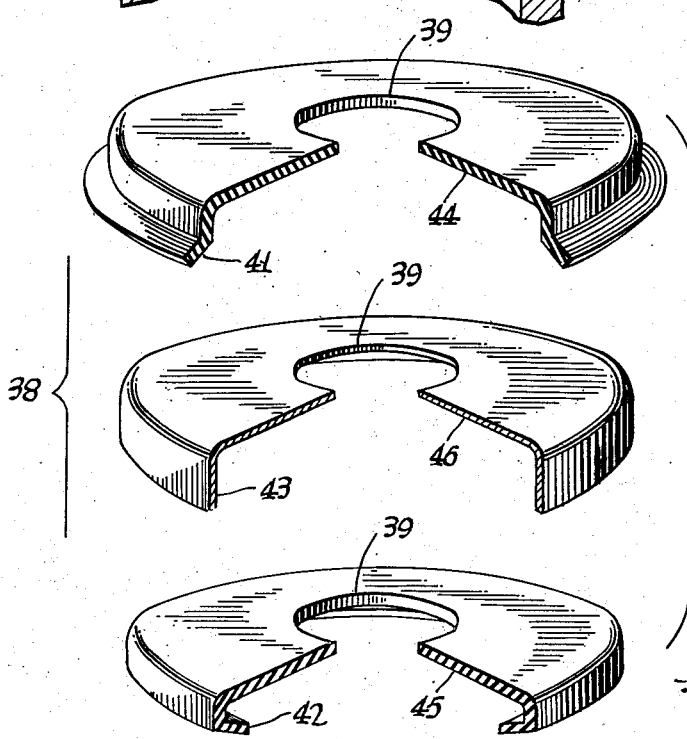

A further object of the invention is to provide a valve having superior functional properties as hereinafter set forth and as illustrated in the attached drawings, wherein:

Fig. 1 is an enlarged fragmentary sectional view of a dry pipe valve made in accordance with the invention, and Fig. 2 is an exploded view in perspective of the gasket device, the elements of the device being broken away in part to more clearly illustrate their structural form.

With reference to the drawings, the valve comprises the usual casing 11 which in service is attached at the bottom to a water supply pipe or main and at the upper end to the sprinkler system (not shown). Within the casing 11 is a valve element 12 which is mounted upon an arm 13 pivotally supported at 14 in the casing. Normally the valve element or clapper 12 will seat upon the upper end of a bushing 15 which is threaded into the inner end of the inlet port 16 of the casing which communicates with the main. When thus seated, the clapper separates the main from the chamber 17 in the upper portion of the valve casing which communicates with the dry pipe sprinkler system. The clapper is normally maintained in seated position against the pressure of the water in the main by a latching lever 18 which is pivotally mounted at 19 in the casing and which engages the outer end of the arm 13 as indicated at 20, said lever being operative by a means not shown and comprising no part of the present invention to engage the arm 13 under normal conditions and to release the arm under conditions resulting from the opening of one or more of the sprinkler heads of the system. When thus released, the clapper 12 is forced by the pressure of the water in the main 16 to a position shown in broken lines in Fig. 1, thereby admitting water to the sprinkler system.

The bushing 15 is provided with concentric seats 21 and 22 which are separated by a recess 23, said recess extending continuously around the circumference of the bushing. At one side the bushing has a port 24 which opens outwardly from the recess 23, said port being threaded for reception of one end of a pipe 25 the outer end of which extends through an opening 26 in the wall of the casing 11 and communicates with the interior of a fitting 27 attached to the outer side of said wall for a purpose more fully set forth hereinafter. The opening 26 is sealed by means of a suitable stuffing box 28.

The valve element 12 is cup shaped and has at its rim an annular seating surface 29 which is arranged for registration with and confronts the seat 21 of the bushing 15 when the valve element is seated. The valve element also has at the center of its cupped cavity 32 a depending boss 33 which is provided with a tapped recess 34. The inner end of this recess lies within a protuberance 35 at the top of the valve body. A disc 36 is secured against the lower face of the boss 33 by means of a screw 37 threaded into the tapped hole 34 as illustrated in Fig. 1.

In accordance with the invention, I provide a cup shaped gasket 38 which is fitted to the cavity 32 and which has a central aperture 39 for the depending cylindrical boss 33. The gasket 38 has at its outer edge or rim an outwardly projecting flange 41 which overlies the rim 31 so that when the valve is seated, this flange will be confined between the seating surface 21 of the bushing 15 and the opposed seating surface 29 of the valve element. The gasket 38 also comprises at its outer edge an inwardly projecting flange 42 which, when the valve is seated, contacts the inner seating surface 22 of the bushing. The gasket also has an annular flange 43 which projects downwardly centrally below the flanges 41 and 42 and is arranged to enter the recess 23 in spaced relation to both the inner and outer side walls of that recess. The gasket 38 is held in place in the cavity 32 by the disc 36 which, as shown in Fig. 1, extends radially over the lower surface of the gasket to a position overlying the flange 42.

Preferably, the gasket 38 is formed as illustrated in Fig. 2 of three elements: an outer cup shaped element 44 which may be of flexible rubber or other suitable material and which has at its outer edge or rim and integral therewith the out-turned flange 41; an inner cup shaped element 45, this element also being composed of resilient rubber or other suitable gasket material and having integral therewith the inturned flange 42; and an intermediate cup shaped element 46, this element being made of relatively thin metal or other suitable rigid or semi-rigid material and having as an integral part thereof the depending flange 43. In assembly, these elements are held together by means of the clamping disc 36. They may be readily removed from the cavity 32 of the valve element by removal of the screw 37 and disc 36 for replacement of all or any of the component cup shaped elements.

Normally the flanges 41 and 42 assume slightly inclined positions as illustrated in Fig. 2, so that when the valve element is moved to the seated position, the flanges 41 and 42 will contact the seating surfaces 21 and 22 of the valve seat bushing 15 and will be deflected to the true radial position shown in Fig. 1. By this means accurate seating of the flanges on the seating surfaces is assured. As previously set forth, the flange 41 is confined between the opposed seating surfaces 21 and 29, whereas the flange 42 engages the seat 22 freely and by its own resiliency.

In practice, when the valve is seated, the water pressure of the main will tend to retain the flange 42 forcibly against the seating surface 22. Any small leakage past the seat 22 will contact the depending flange 43 and will flow downwardly on this flange and be deposited in the bottom of the recess 23. From this recess such leakage will pass outwardly through port 24 and pipe 25 to the fitting 27, said fitting being connected to a suitable alarm, not shown, which is actuated by a predetermined accumulation of water in the fitting. Moisture is thus diverted from the gasketed joint between the seating surfaces 21 and 29.

The above-described valve and gasket assembly is a highly efficient one capable of preventing material leakage either of water from the main or air from the dry pipe system over extended periods of time. Also, since the elements of the gasket are of the special molded form, they cannot readily be replaced by extemporized gasket elements so that assurance is had that gasket replacement will be made only from an authorized source.

I claim:

1. In a dry pipe valve, a valve seat member comprising concentric annular seats spaced radially from each other, a cup shaped valve element having an annular seating surface on the rim thereof for confronting registration with the outer of said seats, and a cup shaped gasket means mounted in the interior cavity of said valve element and having an outwardly projecting flange overlying said rim for confinement between the said outer seat and the said seating surface when the valve element is seated, together with a second flange projecting inwardly for sealing engagement when the valve element is seated with the inner of said seats.

2. A dry pipe valve according to claim 1 wherein the inward flange is exposed in the space below the valve element for retention on its seat by fluid pressure within said space.

3. A dry pipe valve according to claim 1 wherein the gasket means includes an annular flange depending below and intermediate said flanges into the space between the concentric seats of the valve seat member.

4. A dry pipe valve according to claim 3 wherein the depending flange is spaced from both walls of the said space between the concentric seats.

5. A dry pipe valve according to claim 4 wherein the said space is provided with a discharge opening to the outside of the valve.

6. A dry pipe valve according to claim 1 wherein the gasket comprises two cup-shaped elements nesting one within the other, the said outward and inward flanges being carried by the respective elements.

7. A dry pipe valve according to claim 6 wherein the gasket means includes also a third cup-shaped element nested between the said flanged elements and having an annular rim portion projecting beyond the outer faces of said flanges so as to project into the space between the seats of the valve seat member.

8. As a new article of manufacture, a gasket comprising a plurality of cup-shaped and internested elements, the outer and inner of said elements being composed of flexible gasket material and each having at its rim an integral transverse flange extending outwardly and inwardly from said rim respectively, and said outer and inner elements being separated by an intermediate element of relatively stiff material the annular rim portion of which extends beyond the outer faces of said flanges.

ARTHUR C. ROWLEY.

References Cited in the file of this patent

UNITED STATES PATENTS

| Number | Name | Date |
|---|---|---|
| 1,045,619 | Schweizer | Nov. 26, 1912 |
| 1,185,041 | Ashley | May 30, 1916 |
| 1,869,204 | Lowe | July 26, 1932 |
| 2,266,421 | Griffith | Dec. 16, 1941 |
| 2,601,021 | Smith | Sept. 9, 1952 |